E. L. SCOTT.
HOSE SUPPORTER.
APPLICATION FILED FEB. 18, 1911.

998,992.

Patented July 25, 1911.

Witnesses
J. Milton Jester
Edward M. R. Whitman

Inventor
Edna L. Scott
by S. W. Bates.
By
Attorney

UNITED STATES PATENT OFFICE.

EDNA L. SCOTT, OF PORTLAND, MAINE.

HOSE-SUPPORTER.

998,992. Specification of Letters Patent. Patented July 25, 1911.

Application filed February 18, 1911. Serial No. 609,372.

*To all whom it may concern:*

Be it known that I, EDNA L. SCOTT, a citizen of the United States, residing at Portland, in the county of Cumberland and State of Maine, have invented new and useful Improvements in Hose-Supporters, of which the following is a specification.

My invention relates to an attachment for hose supporters of that class in which the stocking is supported by a stud and metal loop. In these hose supporters the stud is supported on the end of a short section of webbing and for securing it in place the stud is riveted to a stud plate. This stud plate is cut away to leave several transverse bars over which the webbing is passed to hold the stud plate in position. A contracted metal loop is loosely suspended from the webbing of the supporter and is adapted to be drawn over the stud to retain the fabric of the stocking which is interposed between the stud and the loop. Hose supporters of this class have always given more or less trouble by tearing and cutting the fabric of the hose and many patents have been taken out aiming to produce a cushioning effect between the loop and the stud. In spite of these improvements however, the annoyance has continued, particularly in the case of fine silk or lisle thread hose. The cutting of a single thread results in what is known as a "drop stitch" and when the thread is once cut, an opening is formed in the fabric of the stocking which gradually travels downward until it often reaches the foot. I have discovered that the most frequent cause of these drop stitches is not the friction between the loop and the stud but the chafing of the stocking against the sharp edges of the stud plate. In order to remedy this defect in the commonly used hose supporter without changing the general construction of the supporter itself, I make use of a guard of flexible material provided with a hole which slips over the stud and which surrounds the shank thereof, the material of the guard extending out and covering the sharp edges of the stud plate.

My invention is best understood by reference to the accompanying drawings in which is shown a loop and stud hose supporter provided with my protecting guard.

Figure 1:
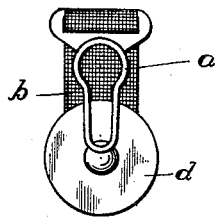
Figure 2:
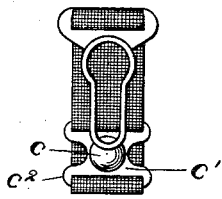
Figure 3:
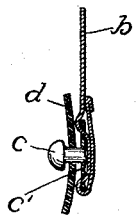

In the drawing, Figure 1 represents a front view of a hose supporter of the common loop and stud type with my guard attached, Fig. 2 is a like view of a supporter without my attachment and Fig. 3 is a central section on an enlarged scale through Fig. 1.

In the drawing, $a$ represents the usual contracted metal loop, $b$ is the webbing which supports the stud, $c$ is the stud and $c'$ is the stud plate. These parts are of the ordinary construction and represent the commercial hose supporter as usually put on the market. It will be seen that as the webbing is threaded through the transverse slots formed in the base plate, the lateral edges $c^2$ of the base plate are exposed and come in contact with the fabric of the stocking when the latter is in place. The constant chafing of the fabric of the stocking against these sharp metal edges soon cuts the threads and produces the drop stitches spoken of. To remedy this difficulty I make use of a guard of flexible material provided with a hole by which it may be held in place by the shank of the stud, the body of the guard extending out and covering the sharp edges of the stud plate.

As herein shown, I make the guard in the form of a circular disk $d$ having a central hole which surrounds the base or shank of the stud when in place, the diameter of the disk being great enough so that the stud plate will be completely covered and its sharp edges cushioned to shield the fabric of the stocking from contact with the metal of the base plate. When the device is to be employed as an attachment to be applied to hose supporters already on the market, I form the disk of rubber, either molded or cut from sheets. A disk of this form may be slipped on over the head of the stud and made to be used with any of the supporters now on the market. The shank of the stud forms a pivoting center on which the disk as it is used rotates, distributing the wearing effect more or less over the whole surface of the disk. The movability of the guard piece with relation to the stud plate also has the effect of increasing the cushioning operation of the flexible disk and of decreasing the strain on the threads of the stocking. This is an important consideration as it prolongs the life of the guard and effectually prevents the cutting of the threads of the stocking.

The guard may be applied to the hose supporters in the process of manufacture and when they are being put together. In this case, it is not necessary to use rubber or any stretchable material as any suitable flexible material may be used as felt, leather, rubber fabric and the like since the central hole may be made just large enough to allow the shank of the stud to pass through.

The size of the hole in the guard to produce the best results should be an easy fit over the shank of the stud so that the guard may have a free motion about the stud as a center for the purpose of distributing the wear and preventing excessive strain.

While the free motion of the guard about the shank of the stud is desirable, good results may be obtained if the guard is so held by the shank as not to rotate freely, the outer portions of the guard being free and unconfined and capable of more or less motion due to the flexible character of the material.

I claim:

1. A hose supporter comprising co-acting loop and stud members, the stud member having a shank and base plate, and a detachable guard consisting of a piece of flexible material having an opening therein to take over the stud, leaving its head uncovered, the walls of said opening being adapted to contact with the shank of the stud and the guard adapted to extend over the face and edges of the stud plate.

2. A hose supporter comprising co-acting loop and stud members, the stud member having a shank and base plate, and a guard consisting of a piece of flexible material having an opening therein through which said stud projects, leaving its head uncovered, the walls of said opening being adapted to contact with the shank of the stud and the guard adapted to extend over the face and edges of the stud plate.

3. A hose supporter comprising co-acting loop and stud members, the stud member having a shank and a base plate with exposed lateral edges, and a perforated guard composed of a piece of flexible material pivoted on said shank below the head thereof.

In testimony whereof I have hereunto set my hand in presence of two subscribing witnesses.

EDNA L. SCOTT.

Witnesses:
S. W. BATES,
CHARLES LOWELL HOWARD.

---

Copies of this patent may be obtained for five cents each, by addressing the "Commissioner of Patents, Washington. D. C."